(12) United States Patent
Helot (10) Patent No.: US 6,309,230 B2
(45) Date of Patent: Oct. 30, 2001

(54) DOCKING STATION FOR MULTIPLE DEVICES

(75) Inventor: Jacques H. Helot, San Mateo, CA (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/752,169

(22) Filed: Dec. 29, 2000

Related U.S. Application Data

(62) Division of application No. 09/344,607, filed on Jun. 25, 1999.

(51) Int. Cl.$^7$ ........................................ H01R 13/44
(52) U.S. Cl. ..................... 439/131; 439/929; 361/727; 361/683
(58) Field of Search ....................... 439/374, 929, 439/131; 361/724, 725, 727, 686, 683

(56) References Cited

U.S. PATENT DOCUMENTS

| | | | |
|---|---|---|---|
| 5,030,128 | 7/1991 | Herron et al. | 439/372 |
| 5,535,093 | 7/1996 | Noguchi et al. | 361/686 |
| 5,537,343 | 7/1996 | Kikinis et al. | 364/708.1 |
| 5,619,398 | 4/1997 | Harrison et al. | 361/686 |
| 5,666,495 | 9/1997 | Yeh | 395/281 |
| 5,689,654 * | 11/1997 | Kikinis et al. | 395/281 |
| 5,822,546 | 10/1998 | George | 395/281 |
| 5,841,424 | 11/1998 | Kikinis | 345/168 |
| 5,964,847 | 10/1999 | Booth, III et al. | 710/1 |
| 6,061,233 | 5/2000 | Jung | 361/686 |
| 6,115,242 | 9/2000 | Lambrecht | 361/684 |

* cited by examiner

Primary Examiner—Tulsidas Patel (57) ABSTRACT

A docking station includes mechanisms to accommodate multiple devices simultaneously. In the preferred embodiment, the docking station can accommodate at least a notebook computer and a palmtop-type handheld device. The docking station preferably facilitates a communication link between the handheld device and the notebook computer when the two devices are docked to the docking station. The communication link allows transmission and synchronization of data between the handheld device and the notebook computer. In a first embodiment of the invention, the docking station includes a docking connector that can mate with the notebook computer. The docking station also includes a docking cradle that can accommodate the handheld device. In the preferred embodiment, the docking cradle is configured to be adjustable in angle, so that the docked handheld device can be positioned at a desired angle. In the most preferred embodiment, the docking cradle includes a security feature that locks the handheld device to the docking cradle to prevent theft. In a second embodiment of the invention, the docking station includes a slot in the housing to accommodate the handheld device, instead of the docking cradle. In a third embodiment of the invention, the docking station is comprised of two modules, a primary docking module and a supplemental docking module. The primary docking module is configured to accommodate the notebook computer, while the supplemental docking module is configured to accommodate the palmtop-type handheld device.

27 Claims, 9 Drawing Sheets

DOCKING STATION FOR MULTIPLE DEVICES

This application is a Division of Ser. No. 09/344,607 filed Jun. 25, 1999.

TECHNICAL FIELD

The invention relates generally to peripheral devices for personal computers and more particularly to a docking station.

BACKGROUND ART

Notebook computers, also known as laptop computers, are widely used by persons who require a mobile computer system. Unlike desktop computers, a notebook computer is compact and light, so that it can be easily carried to a meeting or other destinations where computing may be necessary. Although notebook computers are compact, the computational capabilities of notebook computers may be as powerful as their desktop counterparts.

A disadvantage with notebook computers is that, in general, the monitor, the sound system, and other features of the notebook computers are not of the same high quality as those of the desktop computers. Other disadvantages are a smaller screen and less ergonomic screen position, keyboard and input devices, such as a trackpoint or trackpad. In light of this disadvantage, most notebook computers can be connected to a desktop monitor and an external sound system. Furthermore, most notebook computers can be connected to a printer, a joystick, a back-up tape drive, and other external devices. However, since these external devices have to be individually coupled to the notebook computer, the connecting and disconnecting of these devices can be tedious, especially if the notebook computer is regularly being carried from one place to the next. A docking station can alleviate this problem by providing a mechanism to easily connect the notebook computer to all the external devices. A docking station is a stationary module that can be electrically connected to a number of external devices. In addition, the docking station is configured such that a notebook computer can easily be connected to the docking station. In essence, the docking station allows a notebook computer to be indirectly connected to the external devices that are connected to the docking station when the notebook computer is "docked" to the docking station.

Another type of mobile computer system that is widely in use is a palmtop-type handheld device. These handheld devices are typically not as powerful as notebook computers, and have limited storage space. However, as their name suggests, the palmtop-type handheld devices are much more compact than notebook computers and can fit in the palm of a user. Thus, the palmtop-type handheld devices are easier to carry than notebook computers. Although less powerful than notebook computers, these handheld devices have sufficient computational capability to run various applications for sending and receiving emails, light note taking, scheduling, and other functions. Due to their limited computational capability and storage space, the palm-type handheld devices are commonly used in conjunction with a notebook computer to transfer files between the handheld device and the computer. For example, a handheld device may be used to take notes during a meeting. The handheld device may then be connected to a notebook computer by a cable to electronically transfer the notes from the handheld device to the notebook computer. The transferred notes can be manipulated using word processing software in the notebook computer and/or be printed using a printer that is coupled to the notebook computer.

In addition to the file transfer feature, the connection between the palmtop-type handheld device and the notebook computer enables a user to synchronize the information on the computer with the information on the handheld device. Synchronization is the process of comparing the data on the handheld device with the data on the notebook computer and updating both the handheld device and the computer with the most recent information.

Similar to a docking station for a notebook computer, a docking cradle exists for a palmtop-type handheld device. The docking cradle is used as a stationary module to dock the handheld device. The docking cradle may include a power cord that is connected to a power supply, e.g., a wall socket, to provide power to recharge the batteries of the handheld device. The docking cradle may also include a serial cable to connect the docking cradle to a notebook computer. Alternatively, the docking cradle may be cabled to a docking station to connect the docking cradle to a docked notebook computer. Thus, when the handheld device is docked with the docking cradle, a communication link can be established between the handheld device and the notebook computer via the docking cradle, the serial cable, and the docking station, if any.

Although the use of a serial cable to transfer and synchronize data between the palmtop-type handheld device and the notebook computer operates well for its intended purpose, the serial cable creates a visible cable clutter. In addition, the use of the serial cable results in a connector on the notebook computer or the docking station being permanently occupied by the serial cable for the docking cradle.

In light of these concerns, what is needed is a system in which the serial cable is no longer needed to establish a connection between the palmtop-type handheld device and the notebook computer by means of docking via a docking station.

SUMMARY OF THE INVENTION

A docking station in accordance with the invention includes mechanisms to accommodate multiple devices simultaneously. In the preferred embodiment, the docking station can accommodate at least a notebook computer and a palmtop-type handheld device. The docking station preferably facilitates a communication link between the handheld device and the notebook computer when the two devices are docked to the docking station. The communication link allows transmission and synchronization of data between the handheld device and the notebook computer.

In a first embodiment of the invention, the docking station includes a docking connector that can mate with the notebook computer. The docking connector is electrically connected to a number of connectors on the back of the docking station. These back connectors replicate the connectors on the notebook computer, so that external devices can be connected to the docked notebook computer via the docking station when the external devices are connected to the back connectors of the docking station. Exemplary external devices that can be connected to the docking station include a computer monitor, a printer, a joystick, a sound system, a back-up tape drive, and a scanner.

In this first embodiment, the docking station includes a docking cradle that can accommodate the handheld device. The docking cradle includes a conductive contact region that can connect with a compatible conductive contact region on the handheld device, so that the handheld device is electrically connected to the docking station when attached to the docking cradle. The conductive contact region of the docking cradle is electrically routed to the docking connector, so that a communication link can be established when both the notebook computer and the handheld devices are docked to the docking station. In addition, the conductive contact region of the docking cradle is connected to a power supply of the docking station, so that the battery of the handheld device can be recharged when the handheld device is docked to the docking cradle. Preferably, the docking cradle is structurally configured to position the handheld device at an angle when the handheld device is docked to the docking cradle. The angled position allows a user to easily view the docked handheld device and to operate the handheld device in the docked position. In the preferred embodiment, the docking cradle is configured to be adjustable in angle, so that the docked handheld device can be positioned at a desired angle. The variable angle feature of the adjustable docking cradle allows the docked handheld device to be viewed at an optimal angle to reduce glare and to maximize contrast on the display of the handheld device. In the most preferred embodiment, the docking cradle may also include a security feature to prevent theft of the handheld device when it is docked on the docking station. In this embodiment, the docking cradle includes a pair of locking fingers that can engage notches on the side of the palmtop-type handheld device to lock the docked handheld device to the docking cradle. In order to unlock the handheld device from the docking cradle, a proper password is required to be entered into the docked notebook computer or the handheld device. The docking cradle may be permanently fixed to a housing of the docking station. Alternatively, the docking cradle may be configured such that the docking cradle can be inserted into the docking station housing when the docking cradle is not in use and the docking cradle is folded down, if adjustable.

In a second embodiment of the invention, the docking station includes a slot in the housing to accommodate the palmtop-type handheld device, instead of the docking cradle. Within the slot is the conductive contact region that provides an electrical connection between the handheld device and the docking station when the handheld device is inserted into the slot. The docking station also includes the first connectors to electrically couple the notebook computer to the docking station. Similar to the first embodiment, when both the notebook computer and the handheld device are docked to the docking station, a communication link can be established to transfer and synchronize data between the notebook computer and the handheld device. Furthermore, the battery of the handheld device can be recharged when the handheld device is docked to the docking station.

In a third embodiment of the invention, the docking station is comprised of two modules, a primary docking module and a supplemental docking module. The primary docking module may be a conventional docking station that can only accommodate the notebook computer. The supplemental docking module contains a slot that can accommodate the palmtop-type handheld device. The slot in the supplemental docking module is identical to the slot in the docking station of the second embodiment. The supplemental docking module may include additional slots to also accommodate a number of computer-related devices, such as a CD drive, a DVD drive, a floppy drive, a high storage capacity drive, and a back-up tape drive. The two docking modules are electrically connected, so that a communication link can be established between the notebook computer and the handheld device when they are docked to the primary docking module and the supplemental docking module, respectively. Again, the communication link allows transmission and synchronization of data between the notebook computer and the handheld device.

DETAILED DESCRIPTION

Figure 1:
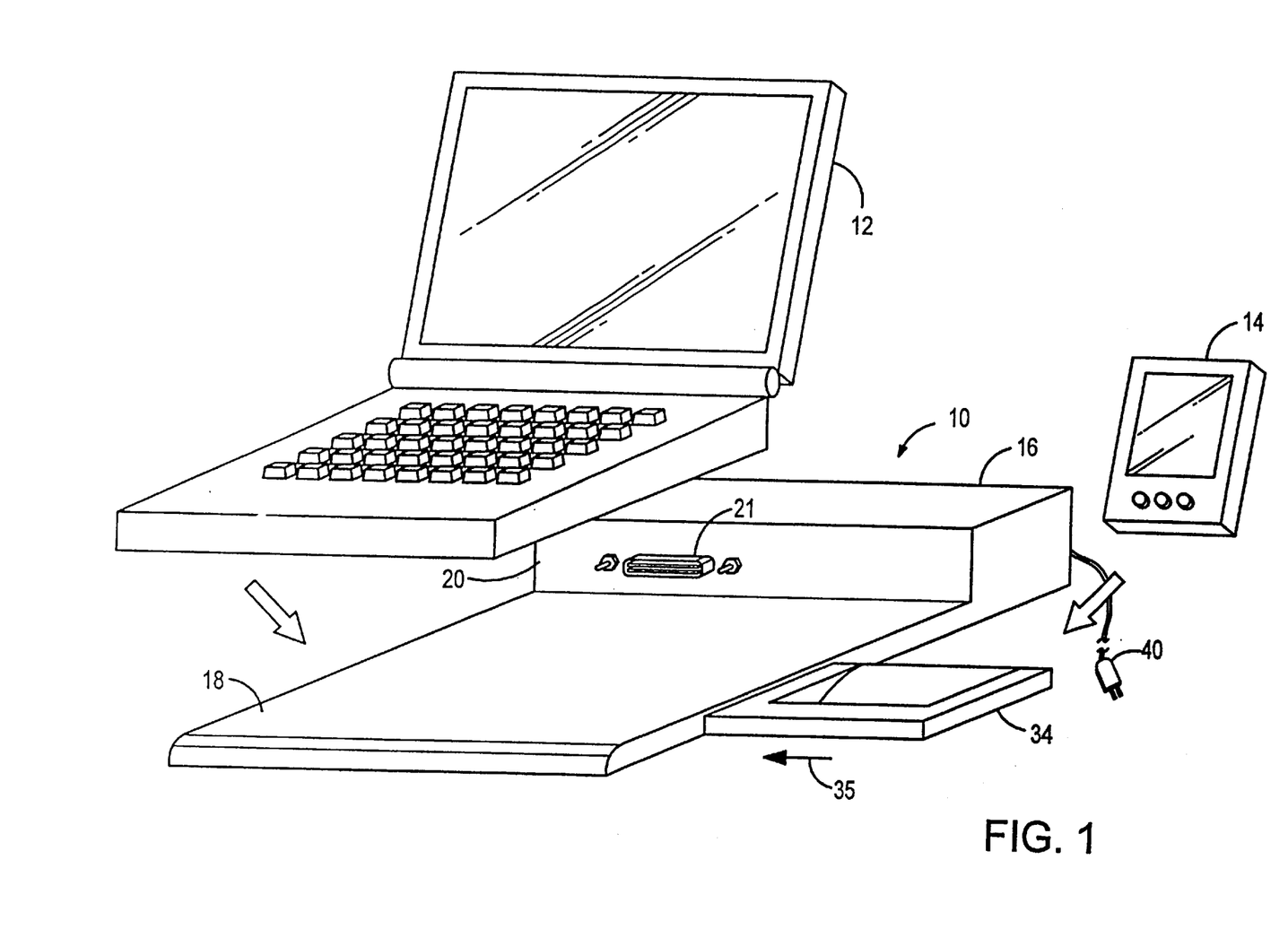
FIG. 1 is a perspective view of a docking station in accordance with a first embodiment of the present invention.

With reference to FIG. 1, a docking station 10 in accordance with a first embodiment of the present invention is shown. The docking station allows both a notebook computer 12 and a palmtop-type handheld device 14 to be "docked" with the docking station. The term "docked" is defined herein as being physically and electrically connected to a particular structure. The notebook computer 12 can be any of the types of portable computers that are commonly referred to as "notebook" or "laptop" computers. The handheld device 14 can be any type of palmtop-type computing device, such as those manufactured by Hewlett-Packard. In addition to accommodating both the notebook computer and the palmtop-type handheld device, the docking station allows a number of external devices to be electrically connected to the docking station. The external devices that can be connected to the docking station may include, but are not limited to, a computer monitor, a printer, a joystick, a sound system, a back-up tape drive, and a scanner.

The docking station 10 includes a housing 16 having a lateral surface 18 and a front surface 20 that allow the docking station to accommodate the notebook computer 12. The front surface includes a docking connector 21 that can mate with a compatible docking connector (not shown) on the notebook computer that is located on the back of the notebook computer. The type of the docking connector on the docking station will depend on the docking connector of the notebook computer. As an example, the connector 21 of the docking station may be a male 240-pin docking connector that can mate with a female connector on the notebook computer.

Figure 2:
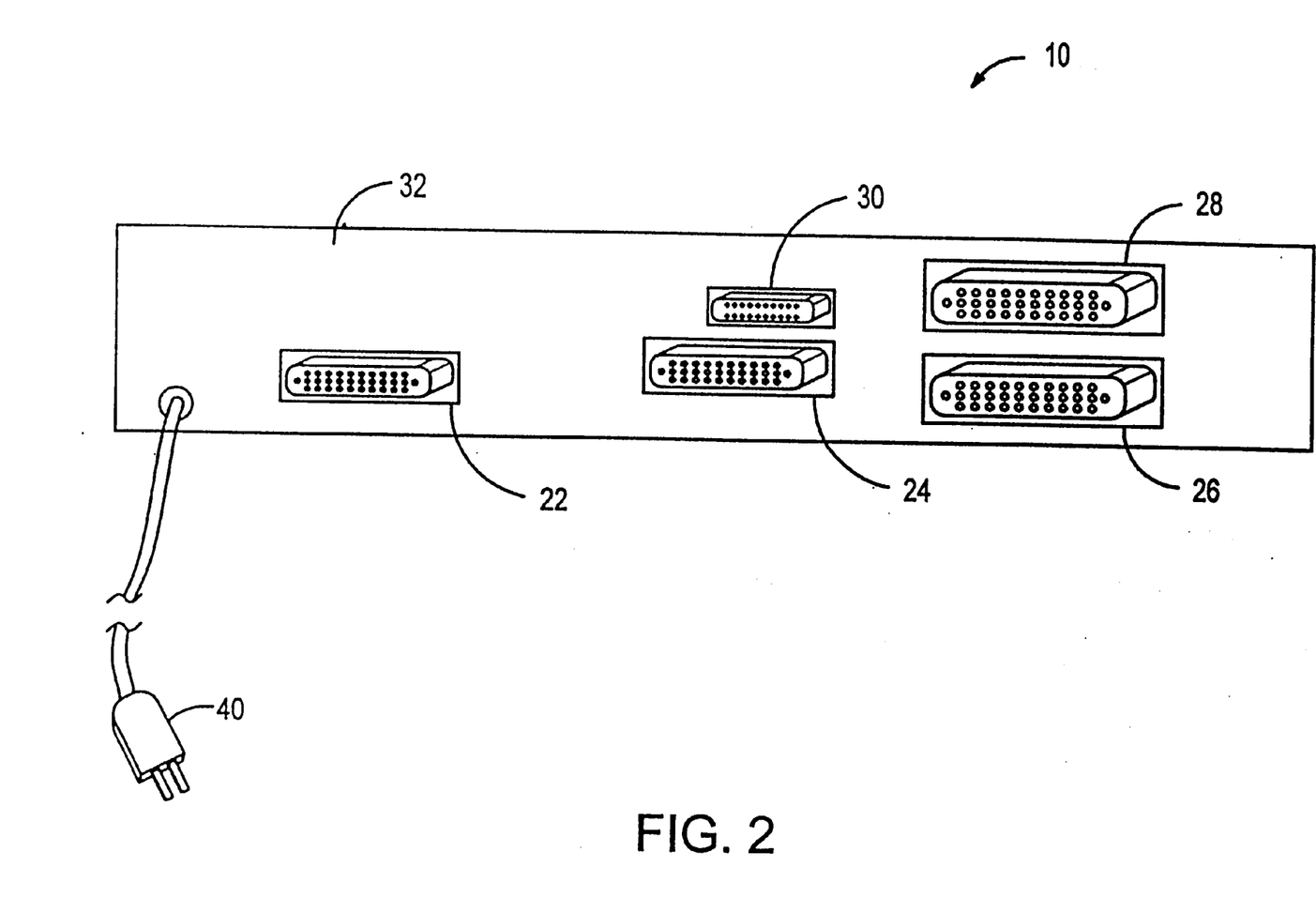
FIG. 2 is a view of the back surface of the docking station of FIG. 1.

The docking connector 21 on the front surface 20 of the docking station housing 16 is electrically coupled to a number of connectors 22, 24, 26, 28 and 30 on a back surface 32 of the docking station housing, as shown in FIG. 2. The connectors 22–30 on the back surface of the docking station housing allow external devices to be connected to the notebook computer via the docking station 10 when the notebook computer is docked to the docking station. Since the notebook computer can be detached from the docking station by disengaging with the docking connector 21 on the front surface 20 of the docking station housing, the external devices that are coupled to the connectors 22–30 on the back surface of the docking station housing can maintain their connection with the docking station when the notebook computer is separated from the docking station. To reconnect the notebook computer to the external devices, the notebook computer is simply connected to the docking station by connecting the docking connector of the notebook computer to the docking connector 21 on the front surface of the docking station housing.

Figure 3:
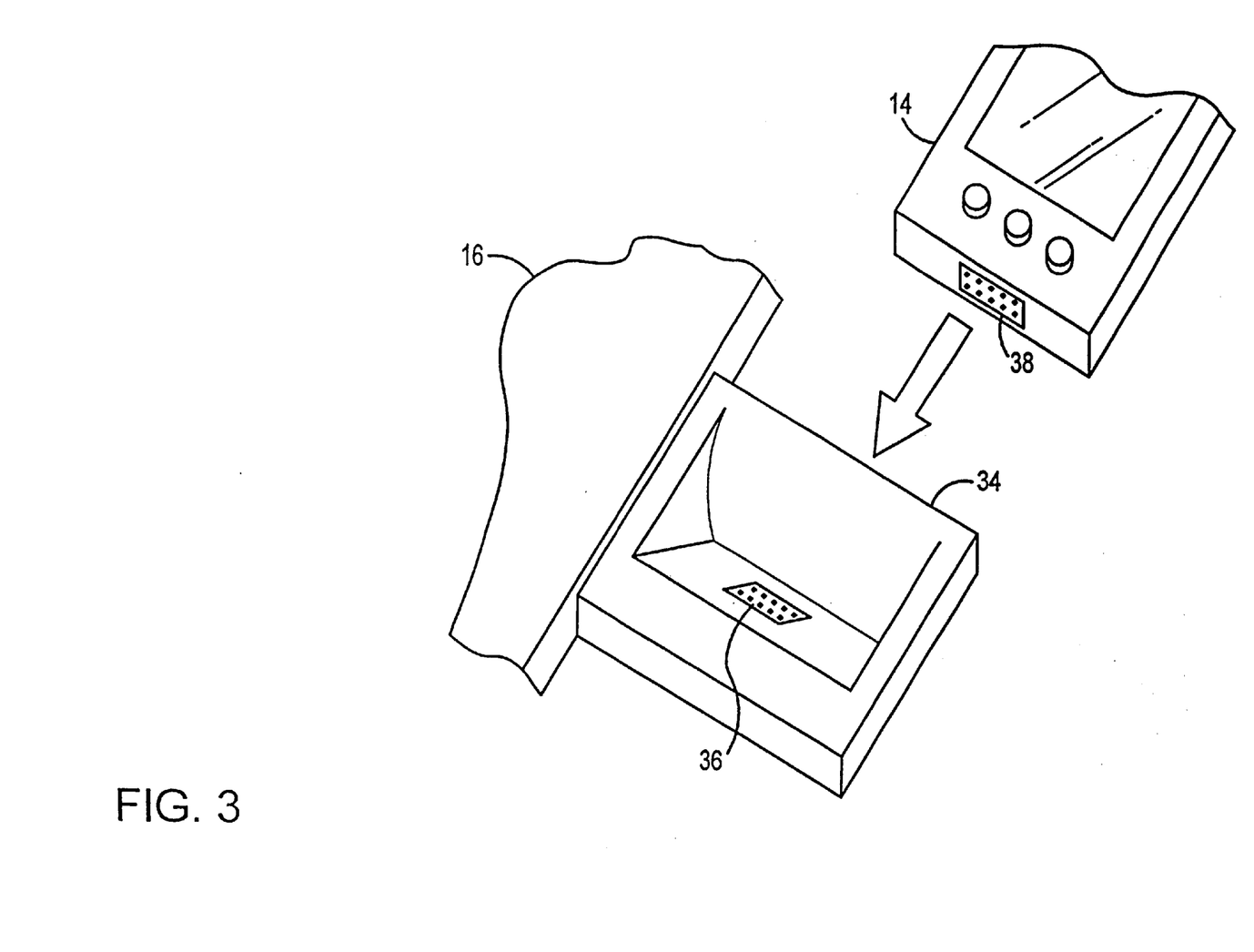
FIG. 3 is a detailed view of a docking cradle included in the docking station of FIG. 1.

Referring now to FIGS. 1 and 3, the docking station 10 also includes a docking cradle 34 that can be inserted into the docking station housing 16 when not in use, as indicated by an arrow 35. The docking cradle is shown in the "out" position in FIG. 1. The docking cradle includes a conductive contact region 36 that can be electrically coupled to a compatible conductive contact region 38 on the palmtop-type handheld device 14, as illustrated in FIG. 3. The conductive contact region 36 is electrically routed to the docking connector 21 on the front surface 20 of the docking station housing, such that when both the notebook computer 12 and the handheld device 14 are docked to the docking station, a data link is established between the two devices. The established link facilitates transmission and synchronization of data between the notebook computer and the handheld device. In addition, the conductive contact region 36 may be electrically configured to receive electrical power via a power cord 40 of the docking station. This external electrical power allows the handheld device to operate without the use of its battery, thereby saving the energy stored in the battery. In addition, the external electrical power can be used by the handheld device to recharge its battery.

Figure 4:
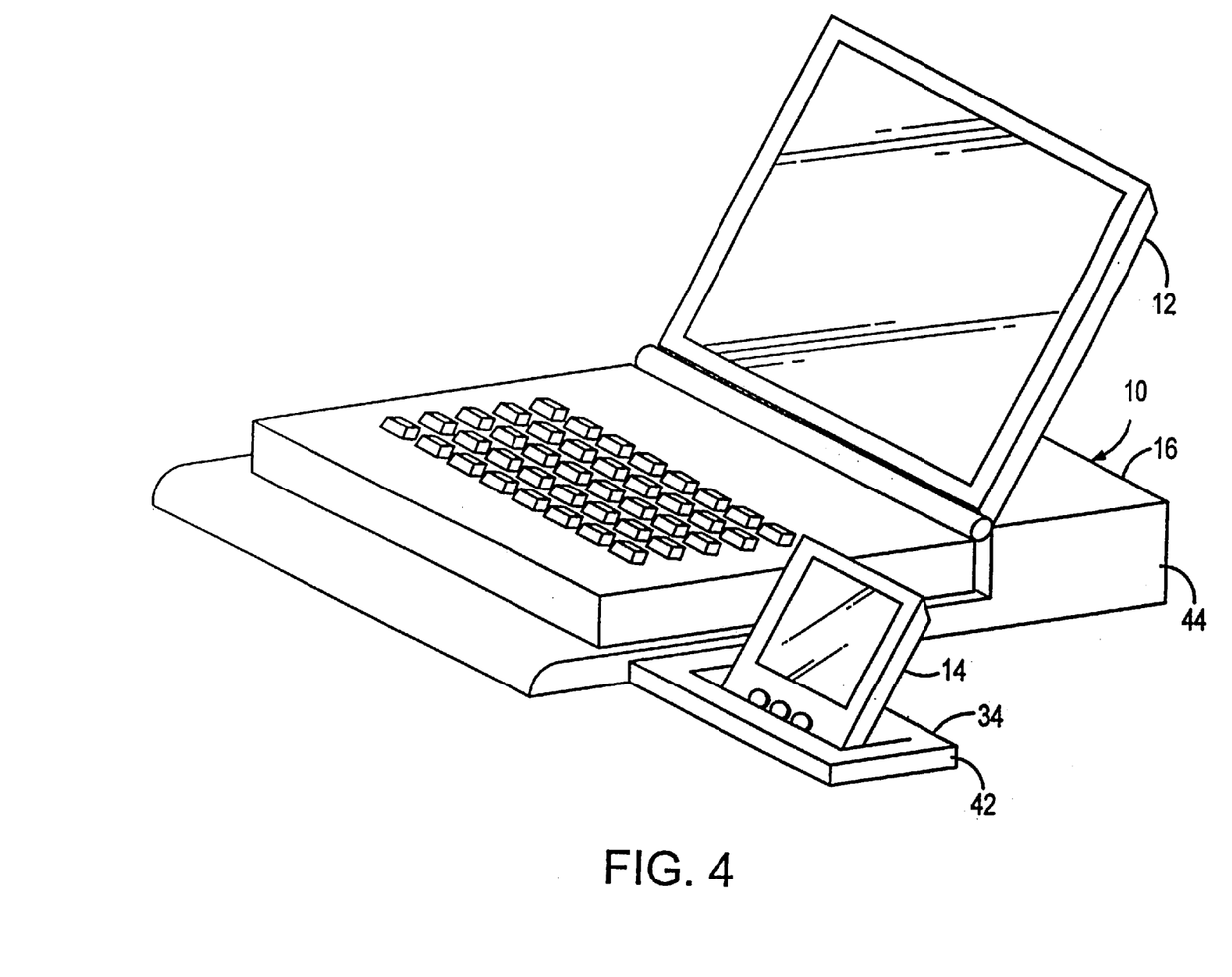
FIG. 4 is a view of the docking station, illustrating the position of a palmtop-type handheld device when docked to the docking cradle.
Figure 5:
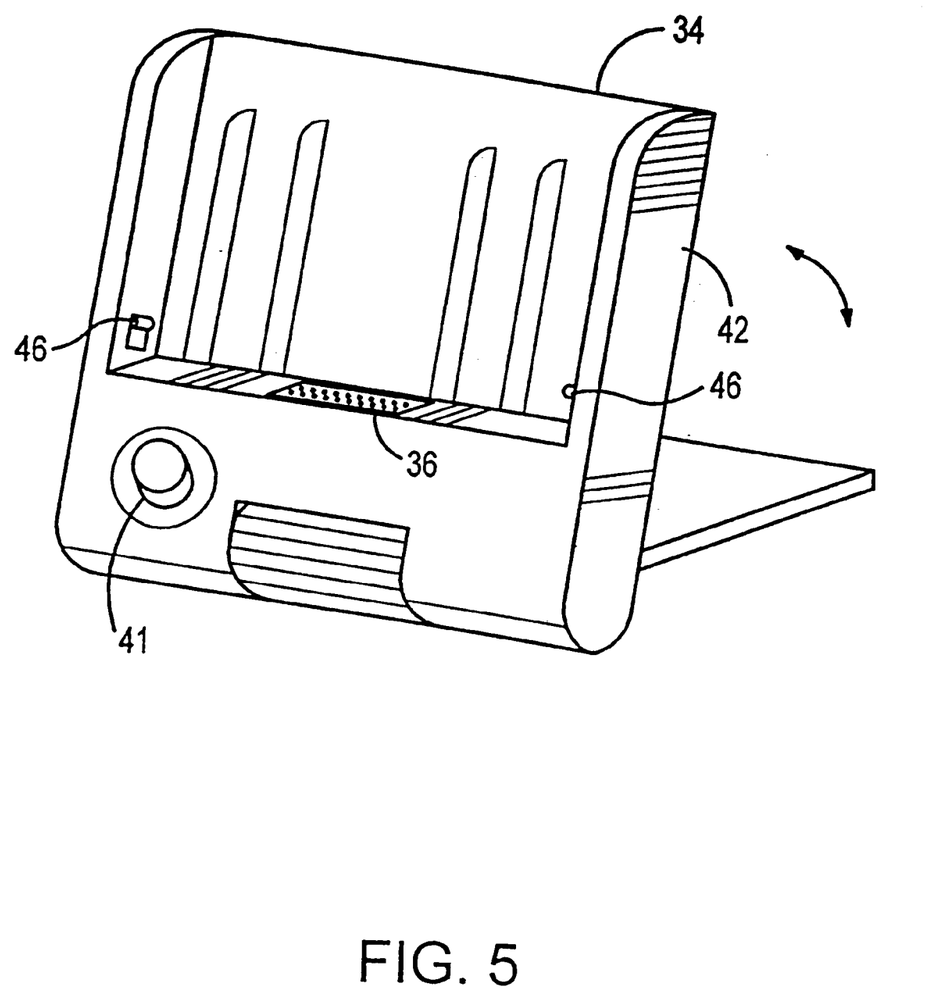
FIG. 5 is a perspective view of a docking cradle that is adjustable in angle.
Figure 6:
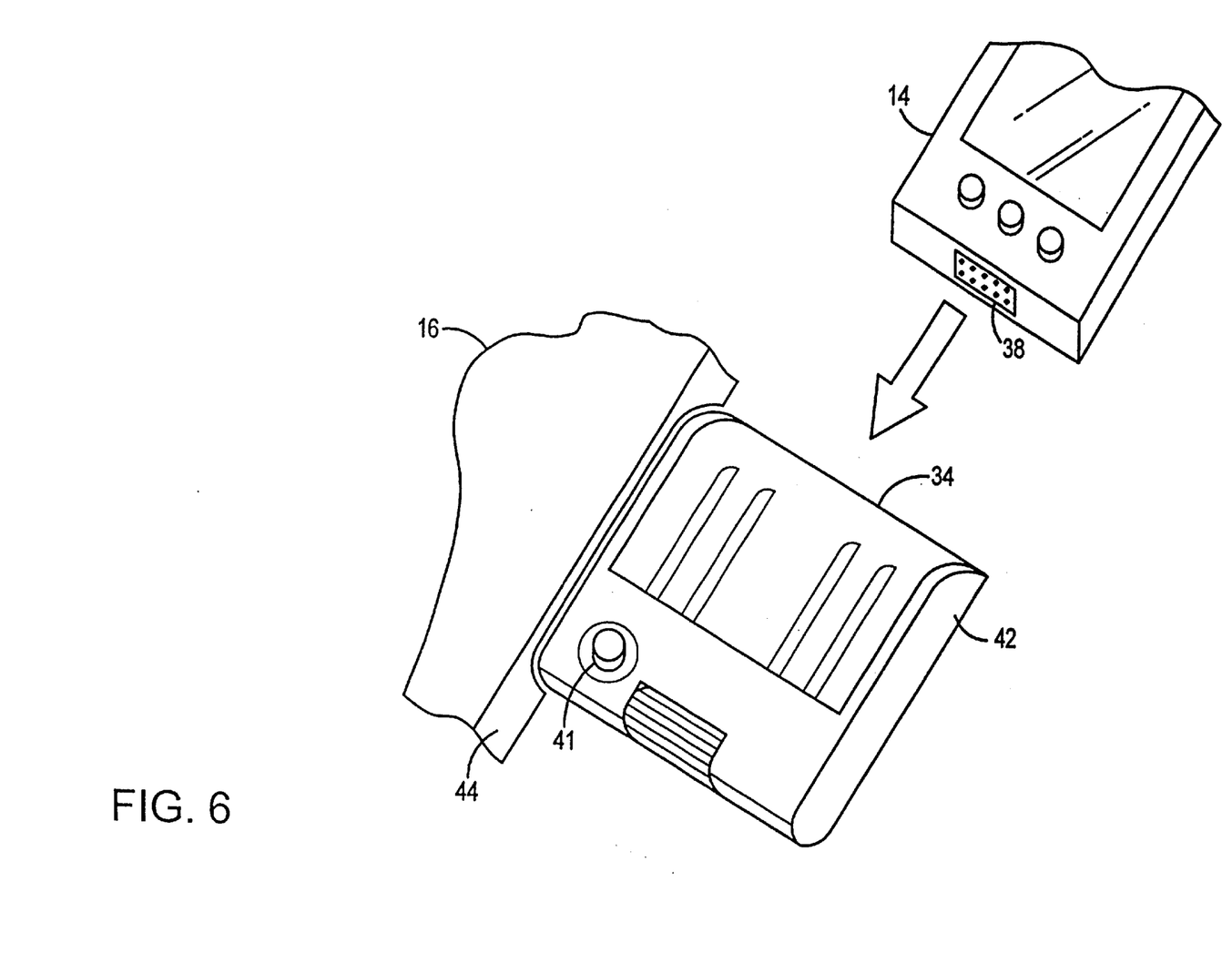
FIG. 6 is a perspective view of the docking cradle of FIG. 5 in a folded-down position.

The docking cradle 34 is preferably configured to position the handheld device 14 at an angle, as shown in FIG. 4, so that a user can easily view the display of the handheld device and operate the docked handheld device. In the preferred embodiment, the docking cradle 34 is configured to be adjustable in angle, so that the docked handheld device can be positioned at a desired angle, as illustrated in FIGS. 5 and 6. In FIG. 5, the docking cradle is positioned at an angle, while the docking cradle is completely folded down in FIG. 6. The variable angle feature of the adjustable docking cradle allows the docked handheld device to be viewed at an optimal angle to reduce glare and to maximize contrast on the display of the handheld device. When the handheld device is not docked with the docking cradle and the docking cradle is folded down, if adjustable, the docking cradle can be inserted into the docking station housing, so that the docking cradle is in the "in" position. In this position, a side surface 42 of the docking cradle is flush against a side surface 44 of the docking station housing 16. In an alternative embodiment, the docking cradle is configured to be permanently fixed in the "out" position, as shown in FIG. 4. In either embodiment, the specific location of the docking cradle on the docking station housing is not critical to the invention.

Figure 7:
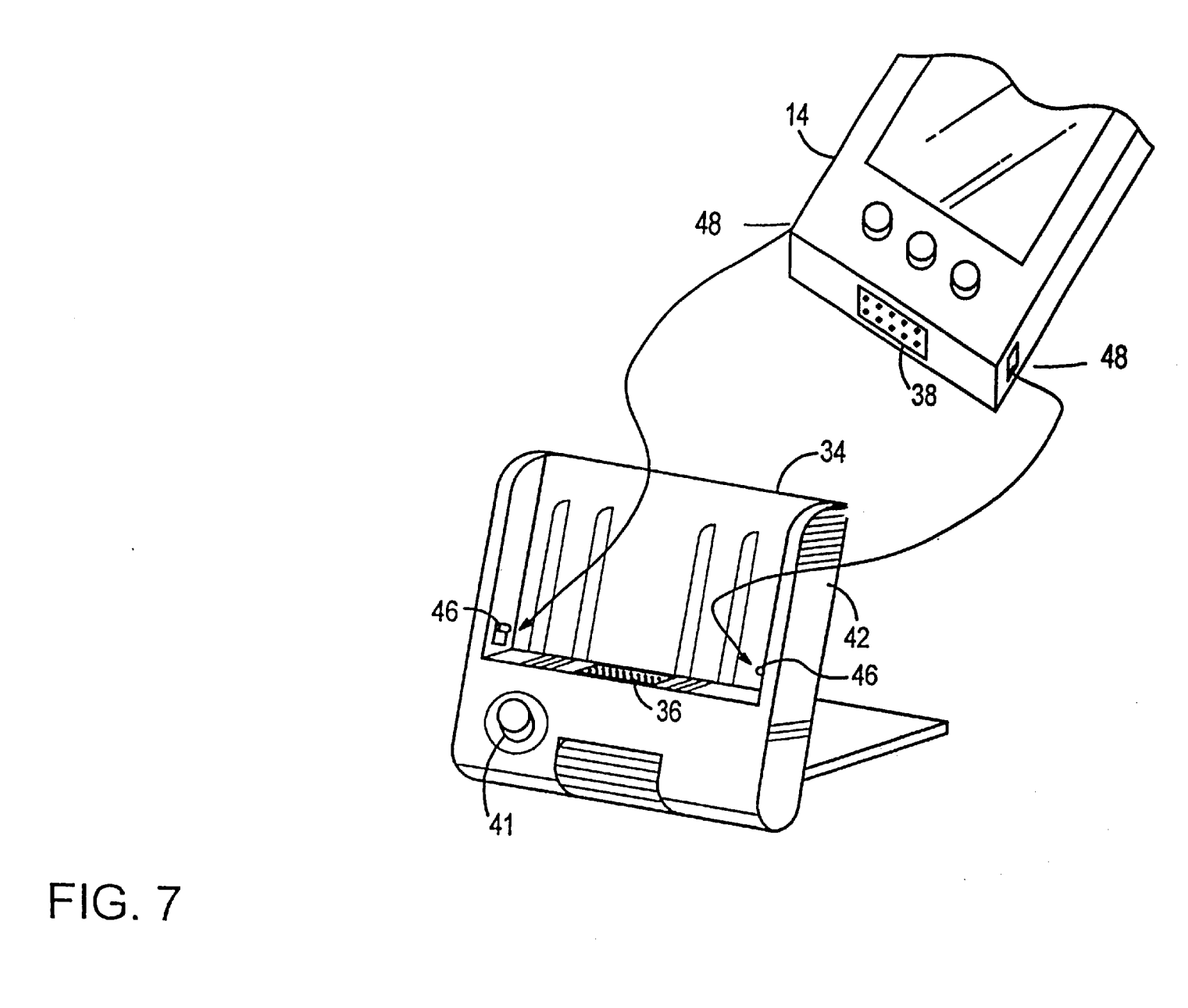
FIG. 7 is a perspective view of the docking cradle of FIG. 5 having locking fingers for security.

In the most preferred embodiment, the docking cradle 34 may also include a security feature to prevent theft of the handheld device 14 when it is docked on the docking station 10. In this embodiment, the docking cradle includes a pair of locking fingers 46 that can engage notches 48 on the side of the palmtop-type handheld device 14 to lock the docked handheld device to the docking cradle, as shown in FIG. 7. An undocking procedure to remove the locked handheld device from the docking cradle involves pressing an undocking button 41 on the docking cradle or a menu item of a software application displayed on the screen of the handheld device or the notebook computer 12. This action initiates the undocking procedure. Once the undocking procedure is initiated, the software application operating in the handheld device or the notebook computer will request a password to be entered. If a correct password is entered, the locking fingers of the docking cradle will disengage from the handheld device and the handheld device can be removed from the docking cradle by hand.

Figure 8:
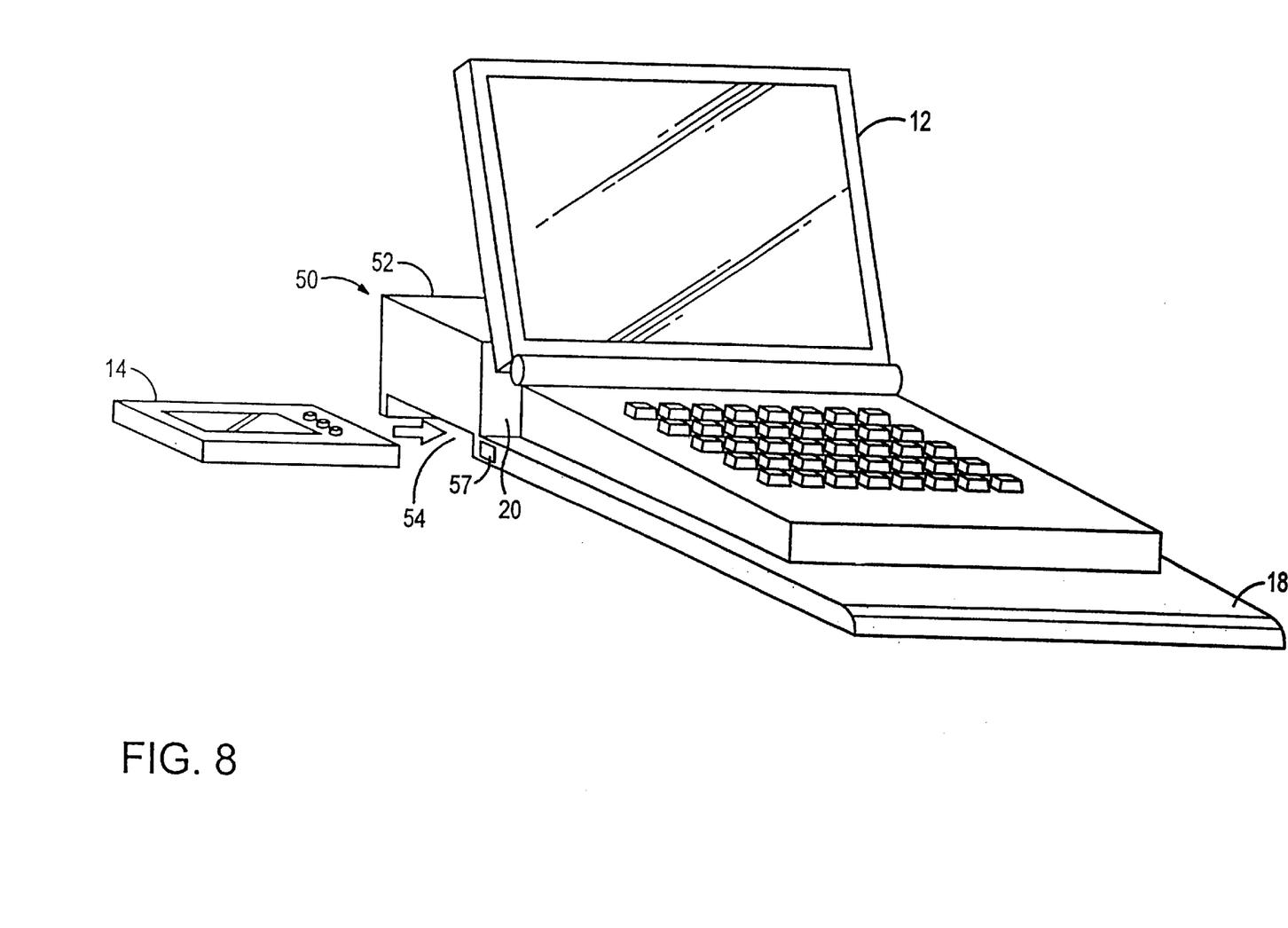
FIG. 8 is a perspective view of a docking station in accordance with a second embodiment of the invention.

Turning to FIG. 8, a docking station 50 in accordance with a second embodiment is shown. The docking station 50 of FIG. 8 is similar to the docking station 10 of FIG. 1 in that the docking station 50 includes the docking connector 21 and the connectors 22–30 and a housing 52 having the surfaces 18 and 20, so that the notebook computer 12 can dock with the docking station 50. However, the docking station 50 includes a slot 54 in the housing 52, instead of a docking cradle, that allows the palmtop-type handheld device 14 to be inserted into the housing in order for the handheld device to be docked with the docking station. The dimensions of the slot roughly coincide with the dimensions of the handheld device, so that the handheld device can be completely inserted into the slot. Within the slot is the electrical contact region 36 (not shown in FIG. 8) to electrically connect the handheld device to the docking station 50 when the handheld device is inserted into the slot. When the handheld device is inserted into the slot of the docking station housing and electrically connected to the contact region within the slot, the handheld device can receive electrical power via a power cord (not shown) to recharge its battery, and be in communication with the docked notebook computer 12 to transfer and synchronize data between the handheld device and the notebook computer. The docking station 50 also includes an eject button 57 on the housing, located near the slot. The eject button is used to disengage the inserted handheld device from the docking station housing.

Figure 9:
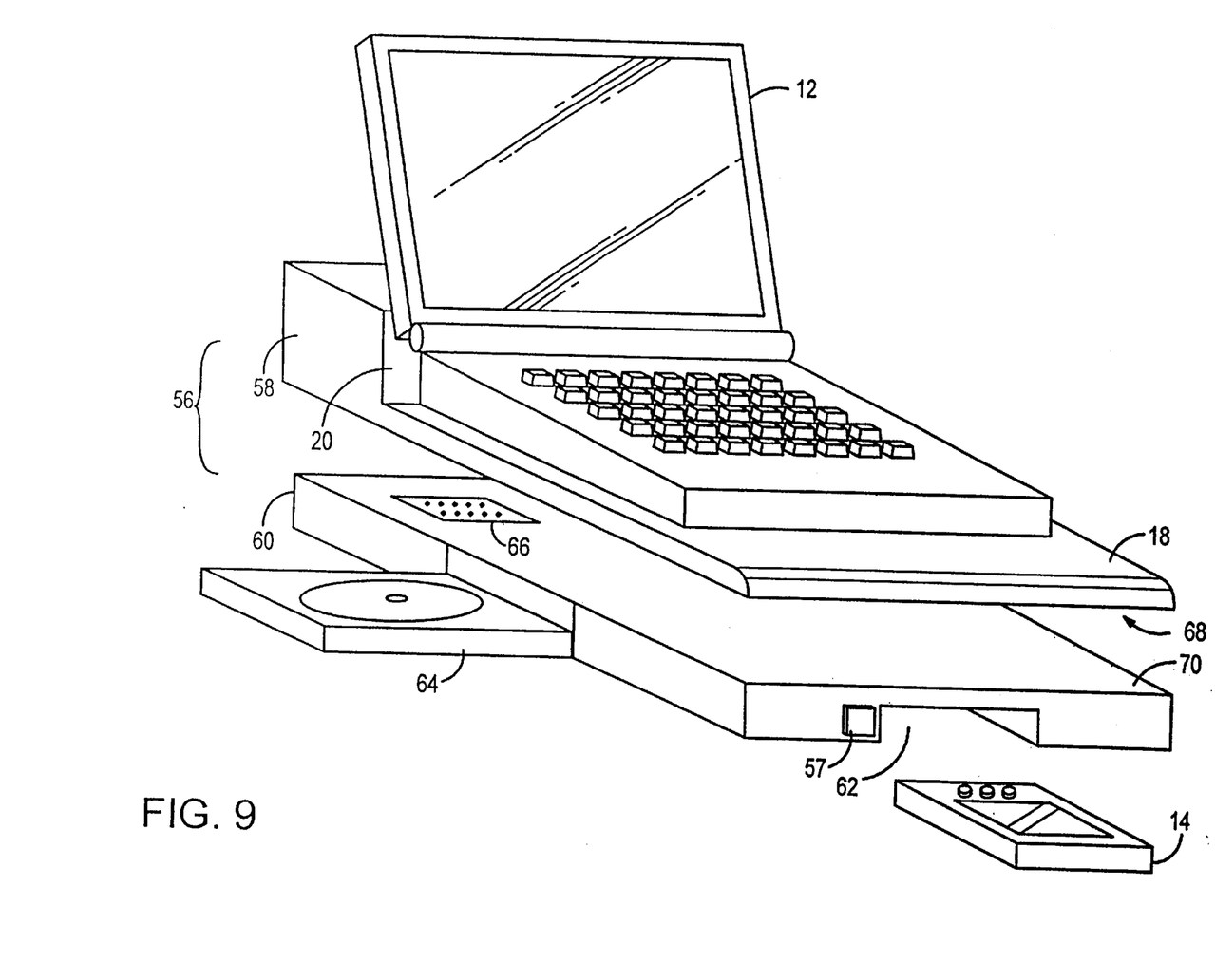
FIG. 9 is a perspective view of a docking station in accordance with a third embodiment of the invention.

With reference to FIG. 9, a docking station 56 in accordance with a third embodiment of the invention is shown. Similar to the docking stations of FIGS. 1 and 8, the docking station 56 can accommodate both the notebook computer 12 and the palmtop-type handheld device 14. However, the docking station 56 is composed of two separate modules, a primary docking module 58 and a supplemental docking module 60. The primary docking module may be a conventional docking station that can only accommodate the notebook computer. Structurally similar to the docking station 10 of FIG. 1, the primary docking module also includes the docking connector 21 and the connectors 22–30 and has the surfaces 18 and 20, so that the notebook computer can dock with the primary docking module.

The supplemental docking module 60 of the docking station contains a slot 62, which is identical to the slot 54 of the docking station of FIG. 8. The slot 62 is configured to accommodate the palmtop-type handheld device 14, so that the handheld device can be docked with the supplemental docking module. The supplemental docking module may also include additional slots to accommodate a number of computer-related devices, such as a CD drive, a DVD drive, a floppy drive, or a high storage capacity drive 64 of FIG. 9 (e.g., the drive sold by Iomega Corporation under the trademark ZIP). The supplemental docking module may further include a slot to recharge a notebook battery. As an example, the supplemental docking module is shown with drive 64 in FIG. 9. The supplemental docking module receives electrical power from an AC outlet via a power cord (not shown). The supplemental docking module includes internal circuitry to distribute the electrical power to the computer-related devices included in the supplemental docking module and the palmtop-type handheld device when it is docked with the supplemental docking module. The supplemental docking module also includes the eject button 57 that disengages the docked handheld device when activated.

The supplemental docking module 60 is electrically connected to the primary docking module 58. The exact manner in which the two modules are connected is not critical to the invention. The docking modules can be connected by a cable. For example, the supplemental docking module may have a cable that can mate with one of the back connectors on the primary docking module. As an alternative to the cable, the docking modules may have electrical contacts on the facing surfaces 68 and 70 of the docking modules to provide an electrical connection when the primary docking module is placed on the supplemental docking module. The electrical contact 66 on the supplemental docking module is shown in FIG. 9. The electrical connection between the two docking modules allows the computer-related devices 64 and the docked handheld device 14 to establish a communication link with the docked notebook computer 12. With respect to the handheld device, this connection between the two docking modules enables synchronization and transmission of data between the docked handheld device to the docked notebook computer.

What is claimed is:

1. A docking station comprising:
   a docking structure;
   first means located on said docking structure for connecting a portable computer to said docking structure, said first means being configured to physically affix said portable computer to said docking structure when said portable computer is connected to said docking structure, wherein portable said computer includes a keyboard; and
   second means located on said docking structure for connecting a handheld computing device to said docking structure, said second means being configured to physically affix said handheld computing device to said docking structure when said handheld device is connected to said docking structure, and wherein said first and second means located on said docking structure allows said portable computer and said handheld computing device to be simultaneously physically affixed to said docking structure.

2. The docking station of claim 1 wherein said first means is in communication with said second means such that a communication link is established when both said handheld computing device and said portable computer are affixed to said docking structure.

3. The docking station of claim 1 wherein said first means includes a first electrical connector that is configured to mate with a corresponding first electrical connector on said portable computer, and wherein said second means includes a second electrical connector that is configured to mate with a corresponding second electrical connector on said handheld computing device.

4. The docking station of claim 3 further comprising a docking cradle that is attached to said docking structure, said docking cradle including said second electrical connector such that said handheld computing device is attached to said docking cradle when said handheld computing device is connected to said second electrical connector.

5. The docking station of claim 4 wherein said docking cradle includes a mechanism to lock said handheld computing device to said docking cradle when said handheld computing device is attached to said docking cradle.

6. The docking station of claim 5 wherein said mechanism is configured to unlock said handheld computing device from said docking cradle when a command is entered into said handheld computing device or said portable computer either via a menu item of a software application operating in said handheld computing device or said portable computer, or via an undocking button located on said docking cradle.

7. The docking station of claim 4 wherein said docking structure is configured such that said docking cradle can be inserted into said docking structure when said handheld computing device is not attached to said docking cradle.

8. The docking station of claim 4 wherein said docking cradle is structurally configured to position said handheld computing device at an angle when said handheld computing device is attached to said docking cradle, said angle being relative to a line normal to a plane defined by a flat surface on which said docking station can be placed.

9. The docking station of claim 8 wherein said docking cradle is structurally adjustable to vary said angle such that said handheld computing device can be positioned at a desired angle when said handheld computing device is attached to said docking cradle.

10. The docking station of claim 1 wherein said docking structure includes a slot that can accommodate said handheld computing device within said docking structure, said second means located within said slot such that said handheld computing device is connected to said second means when said handheld computing device is inserted into said slot of said docking structure.

11. The docking station of claim 10 wherein said docking structure includes a first module and a second module, said first module including said first means such that said portable computer is attached to said first module when said portable computer is connected to said first means, said second module having said slot such that said handheld computing device is embodied in said second module when said handheld computing device is connected to said second means.

12. The docking station of claim 11 wherein said second module further includes at least one computer-related device.

13. The docking station of claim 1 further comprising a power cord to receive electrical power from an external source, said power cord being connected to said second means such that said handheld computing device is supplied with said electrical power when said handheld computing device is connected to said second means.

14. The docking station of claim 1 wherein said second means is configured to be connected to a palmtop-type handheld device.

15. A docking station comprising:
   a housing having a first connector, said first connector being configured to mate with a first corresponding connector on a portable computer such that said portable computer is physically affixed and electrically coupled to said housing when said first connector of said housing and said first corresponding connector on said portable computer are mated, wherein portable said computer includes a keyboard; and a docking cradle attached to said housing, said docking cradle having a second connector that is configured to mate with a second corresponding connector on a handheld computing device such that said handheld computing device is physically affixed and electrically coupled to said docking cradle when said second connector of said docking cradle and said second corresponding connector of said handheld computing device are mated, and wherein said docking station allows said portable computer and said handheld computing device to be simultaneously physically affixed to said docking station.

16. The docking station of claim 15 wherein said second connector of said docking cradle is operatively connected to said first connector of said housing such that a communication link is established between said portable computer and said handheld computing device when said handheld computing device is affixed to said docking cradle and said portable computer is affixed to said housing.

17. The docking station of claim 15 wherein said docking cradle and said housing are structurally engaged such said docking cradle can be inserted into said housing when said handheld computing device is not affixed to said docking cradle.

18. The docking station of claim 15 wherein said docking cradle includes a mechanism to lock said handheld computing device to said docking cradle when said handheld computing device is attached to said docking cradle.

19. The docking station of claim 18 wherein said mechanism is configured to unlock said handheld computing device from said docking cradle when a command and a password are entered into said handheld computing device or said portable computer.

20. The docking station of claim 15 wherein said docking cradle is shaped such that said handheld computing device is positioned at an angle when said handheld computing device is attached to said docking cradle, said angle being relative to a line normal to a plane defined by a flat surface on which said docking station can be placed.

21. The docking station of claim 20 wherein said docking cradle is structurally adjustable to vary said angle such that said handheld computing device can be positioned at a desired angle when said handheld computing device is attached to said docking cradle.

22. The docking station of claim 15 wherein said docking cradle is configured to accommodate a palmtop-type handheld device.

23. A docking system comprising:

a structure having a slot to accommodate a handheld computing device;

a first electrical connector located on said structure, said first connector being configured to mate with a first corresponding electrical connector on a portable computer such that said portable computer is physically affixed to said structure when said first connector of said structure and said first corresponding connector on said portable computer are mated, wherein portable said computer includes a keyboard; and a second electrical connector located within said slot of said structure, said second connector being configured to mate with a second corresponding electrical connector on said handheld computing device when said handheld computing device is positioned within said slot of said structure while said portable computer is physically affixed to said structure.

24. The docking station of claim 23 wherein said slot of said structure has dimensions to accommodate a palmtop-type handheld device.

25. The docking station of claim 23 wherein said second connector is electrically connected to said first connector such that said portable computer and said handheld computing device are electrically coupled when both said portable computer and said handheld computing device are affixed to said structure.

26. The docking station of claim 23 wherein said structure includes a first module and a second module, said first module including said first connector such that said portable computer is attached to said first module when said portable computer is electrically mated to said first connector, said second module having said slot such that said handheld computing device is embodied in said second module when said handheld computing device is electrically connected to said second connector of said structure.

27. The docking station of claim 23 further comprising a power cord to receive electrical power from an external source, said power cord being connected to said second connector such that said handheld computing device is supplied with said electrical power when said handheld computing device is electrically connected to said second connector of said structure.

* * * * *